(12) United States Patent
Anderson

(10) Patent No.: US 7,086,591 B2
(45) Date of Patent: Aug. 8, 2006

(54) AIRPORT CHECK-IN SYSTEM AND METHOD

(75) Inventor: Jeffrey L. Anderson, Renton, WA (US)

(73) Assignee: Alaska Airlines, Inc., Seattle, WA (US)

( * ) Notice: Subject to any disclaimer, the term of this patent is extended or adjusted under 35 U.S.C. 154(b) by 0 days.

(21) Appl. No.: 10/644,693

(22) Filed: Aug. 20, 2003

(65) Prior Publication Data

US 2004/0035928 A1 Feb. 26, 2004

Related U.S. Application Data

(60) Provisional application No. 60/405,117, filed on Aug. 21, 2002.

(51) Int. Cl.
*G07B 15/02* (2006.01)
(52) U.S. Cl. .......................... 235/384; 235/385; 705/5; 705/6
(58) Field of Classification Search ................ 235/385, 235/384, 375, 376, 380; 705/5, 6
See application file for complete search history.

(56) References Cited

U.S. PATENT DOCUMENTS

| | | | | |
|---|---|---|---|---|
| 4,239,434 A | * | 12/1980 | Gannon | 198/349.8 |
| 5,724,520 A | * | 3/1998 | Goheen | 705/5 |
| 5,793,639 A | * | 8/1998 | Yamazaki | 235/384 |
| 6,044,353 A | * | 3/2000 | Pugliese, III | 705/5 |
| 6,158,658 A | * | 12/2000 | Barclay | 235/384 |
| 6,594,547 B1 | * | 7/2003 | Manabe et al. | 700/227 |
| 6,695,203 B1 | * | 2/2004 | Iki et al. | 235/384 |
| 6,735,575 B1 | * | 5/2004 | Kara | 705/50 |
| 2003/0061080 A1 | * | 3/2003 | Ross | 705/6 |
| 2003/0189094 A1 | * | 10/2003 | Trabitz | 235/385 |

OTHER PUBLICATIONS

Trip Ticket, Feb. 1975, IBM Technical Disclosure Bulletin, Issue 9, vol. 17, pp. 2768-2770.*

(Continued)

*Primary Examiner*—Uyen-Chau N Le
(74) *Attorney, Agent, or Firm*—Black Lowe & Graham, PLLC

(57) ABSTRACT

An improved airport check-in system includes a central conveyor and a plurality of outwardly-extending conveyors. Airline agents operate workstations adjacent the outwardly extending conveyors, which are accessible by passengers so that passengers can deposit their own bags directly onto the conveyors. A number of electronic kiosks are provided to obtain boarding passes having encoded passenger information. Check-in is accomplished in two steps, including first obtaining a boarding pass and then proceeding to a baggage check station to check bags. At the baggage check station, the boarding pass is scanned to quickly retrieve key information that would otherwise have been gathered verbally, hastening the check-in process.

24 Claims, 11 Drawing Sheets

OTHER PUBLICATIONS

Speed Check, Airport of the Future, a big hit so far, to be put to high-volume test, Alaska's World, Jul. 17, 2002.

Ayer, Bill, Fast Forward, Alaska Airlines Magazine, Jul. 2002, p. 7.

Gillie, John, Getting travelers out of lines, onto jets, The News Tribune, Mar. 25, 2002, p. A1, Tacoma, Washington.

Conrard, Don, CSAs say aloha to island concept, Alaska's World, Aug. 22, 2001.

Adams, Marilyn, Tech takes a bigger role in air service, USA Today, Jul. 18, 2001.

Top 100, Magazine lists AAG among the nation's best e-businesses, Alaska's World, Jun. 19, 2001.

Walsh, Jack, In the News: Plenty of flowers among a few thorns, Alaska's World, May 14, 2001.

* cited by examiner

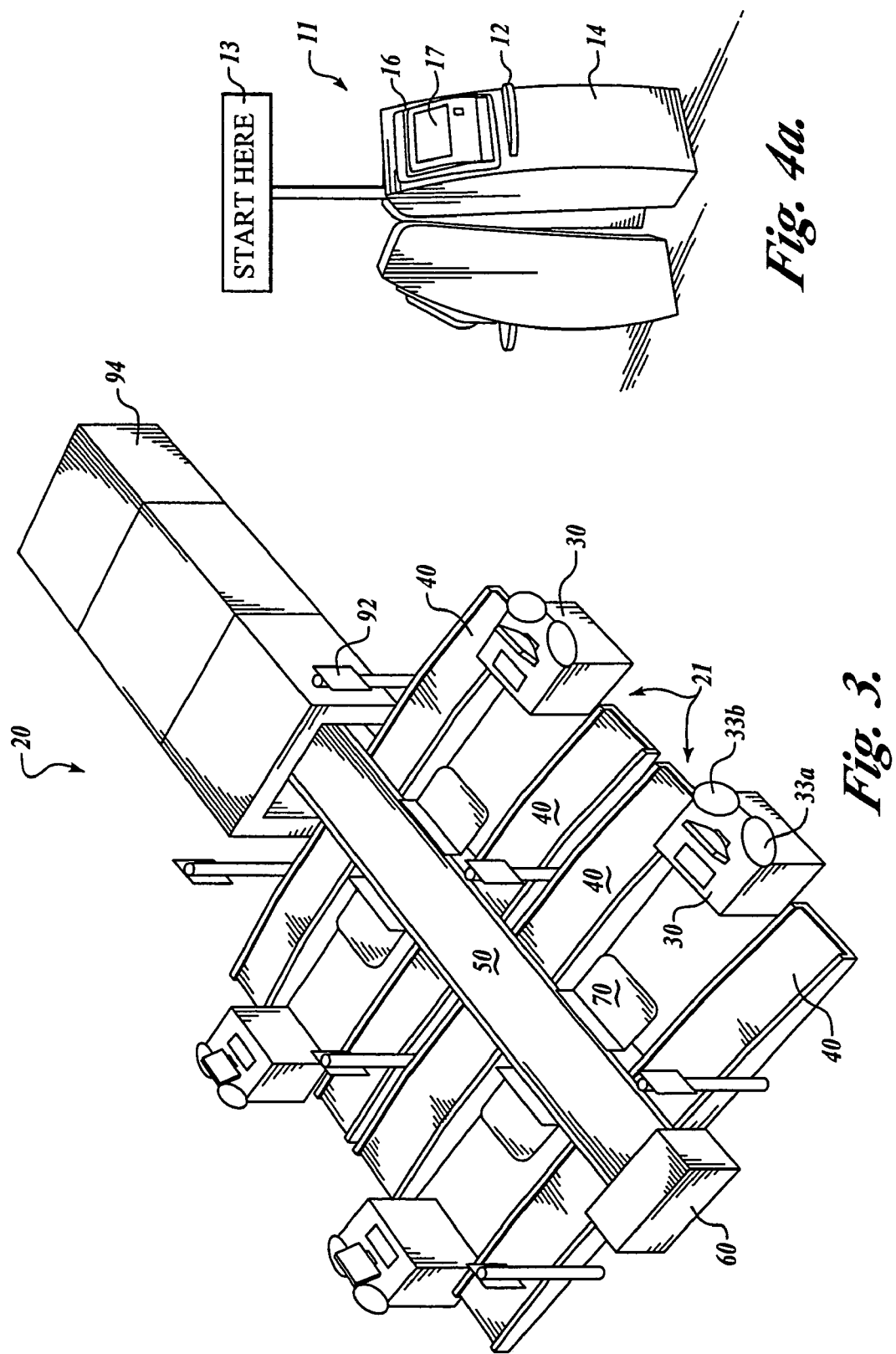

AIRPORT CHECK-IN SYSTEM AND METHOD

PRIORITY CLAIM

This application claims the benefit of and incorporates by reference prior provisional application Ser. No. 60/405,117, filed Aug. 21, 2002.

FIELD OF THE INVENTION

This invention relates generally to methods and systems for checking passengers and baggage into airline flights.

BACKGROUND OF THE INVENTION

Current airport check-in involves a process and structural configuration that has changed little, if at all, for decades. Passengers typically wait with their bags in sometimes lengthy lines approaching a ticket counter. Once at the counter, an agent asks each passenger a number of questions regarding each passenger's destination, number of bags to check, frequent flyer number, and other matters pertinent to the travel. Gathering this information takes time and, multiplied over many passengers, can significantly slow the process.

Agents are aware of the lengthy lines, and endeavor to hasten each passenger through the process as quickly as possible. In order to do so, each agent can spend very little time with each passenger doing anything other than asking for the necessary information regarding the passenger's name, destination, number of bags to check, and other flight information. This leaves little time for other cordial interaction between the passenger and agent, and makes it difficult for agents to carefully assess passengers for security risks or other issues.

Once passengers reach the front of the ticket counter, the design of the counter makes checking in baggage awkward and injury prone. Passengers or agents must first lift heavy bags onto a scale near the counter, where they are weighed and tagged. Then agents must lift the bags from the scale and deposit them onto the conveyor behind the counter so that they may be transported to the appropriate aircraft. The repeated heavy lifting of bags may in some instances cause injury to the agents.

Accordingly, there is a need for an improved check-in process and system that would overcome some of these disadvantages.

SUMMARY OF THE INVENTION

The present invention provides an improved airport check-in organization comprising self-service electronic kiosks and baggage drop points. The electronic kiosks are provided in various locations around the terminal to enable passengers to obtain boarding passes and check-in. The baggage drop-off points are preferably near the kiosks but separated from them so that passengers will first check-in at a kiosk, then move to the baggage drop point to check baggage.

In accordance with further preferred aspects of the invention, as much information as possible is gathered at the electronic kiosk so that it need not be gathered again by an agent attending to the baggage drop point. Accordingly, the passengers will provide information such as the number of bags to check when obtaining a boarding pass so that, in most cases, the question will not need to be repeated by the agent. In addition, the boarding passes can include encoded information indicating whether additional charges or fees are applicable, enabling the agent at the baggage drop to more quickly determine the fees and thereby reduce the time a passenger must wait.

In accordance with other preferred aspects of the invention, baggage conveyors are provided in locations at which passengers can directly place their own bags onto the conveyor, eliminating the need for agents to repeatedly lift and carry the heavy bags for each customer.

In accordance with still further preferred aspects of the invention, the baggage drop conveyors are lowered to further facilitate placing bags onto the conveyors.

In accordance with yet other preferred aspects of the invention, passengers may check-in remotely, such as over the Internet, then proceed directly to a bag-drop location to check baggage.

BRIEF DESCRIPTION OF THE DRAWINGS

The preferred and alternative embodiments of the present invention are described in detail below with reference to the following drawings.

FIG. 3 is a perspective view of a preferred baggage check station;

FIG. 4a is a perspective view of a preferred boarding pass kiosk;

DETAILED DESCRIPTION OF THE PREFERRED EMBODIMENT

The preferred embodiment of the check-in system and process of the present invention includes the integration of hardware, software and procedures to shorten the check-in process. In this form the invention includes one or more self-service kiosks, boarding passes that are bar coded or that otherwise contain stored information, and a baggage drop location.

Figure 1:
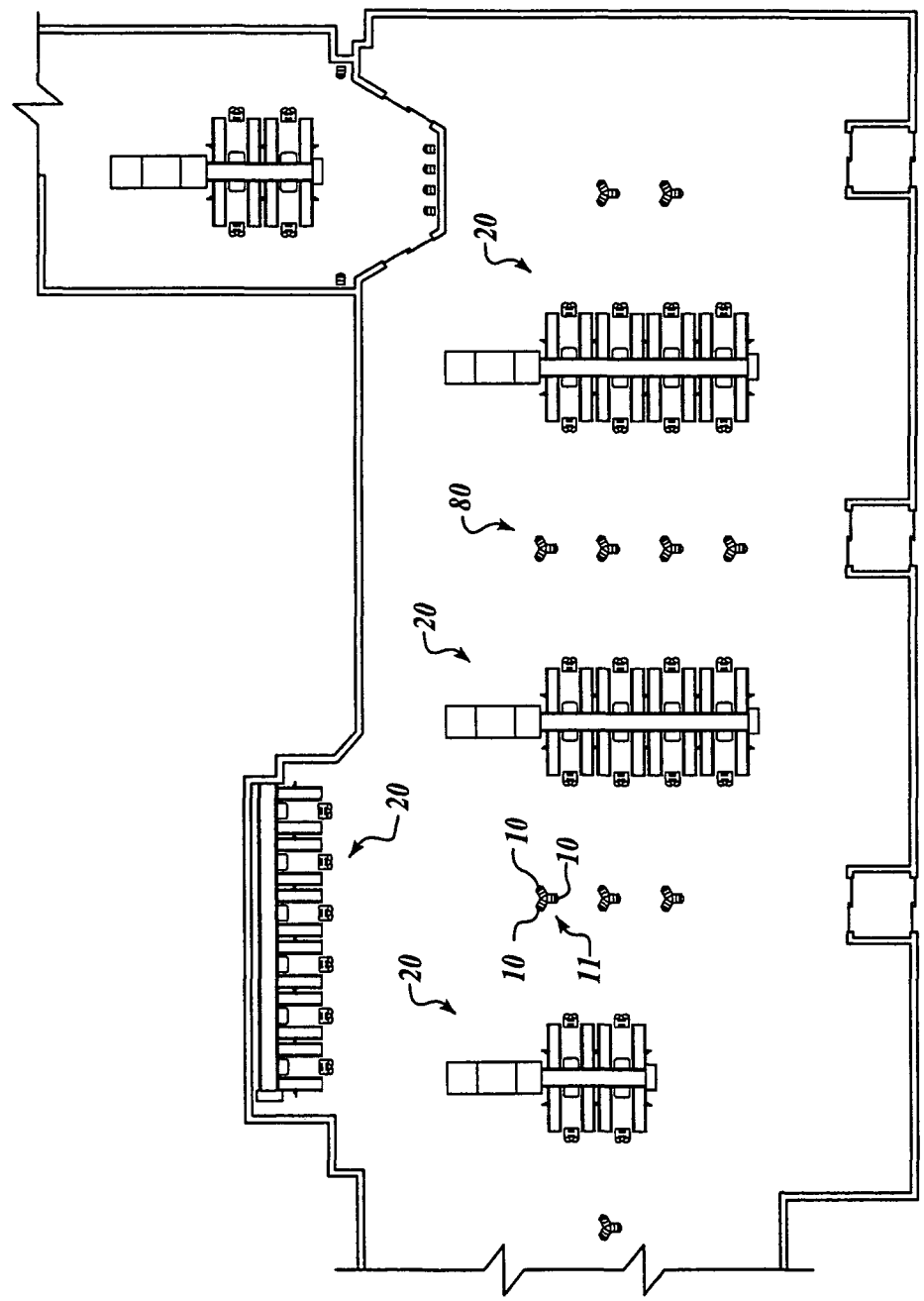
FIG. 1 is a plan view of a preferred boarding pass and baggage check station system.
Figure 2:
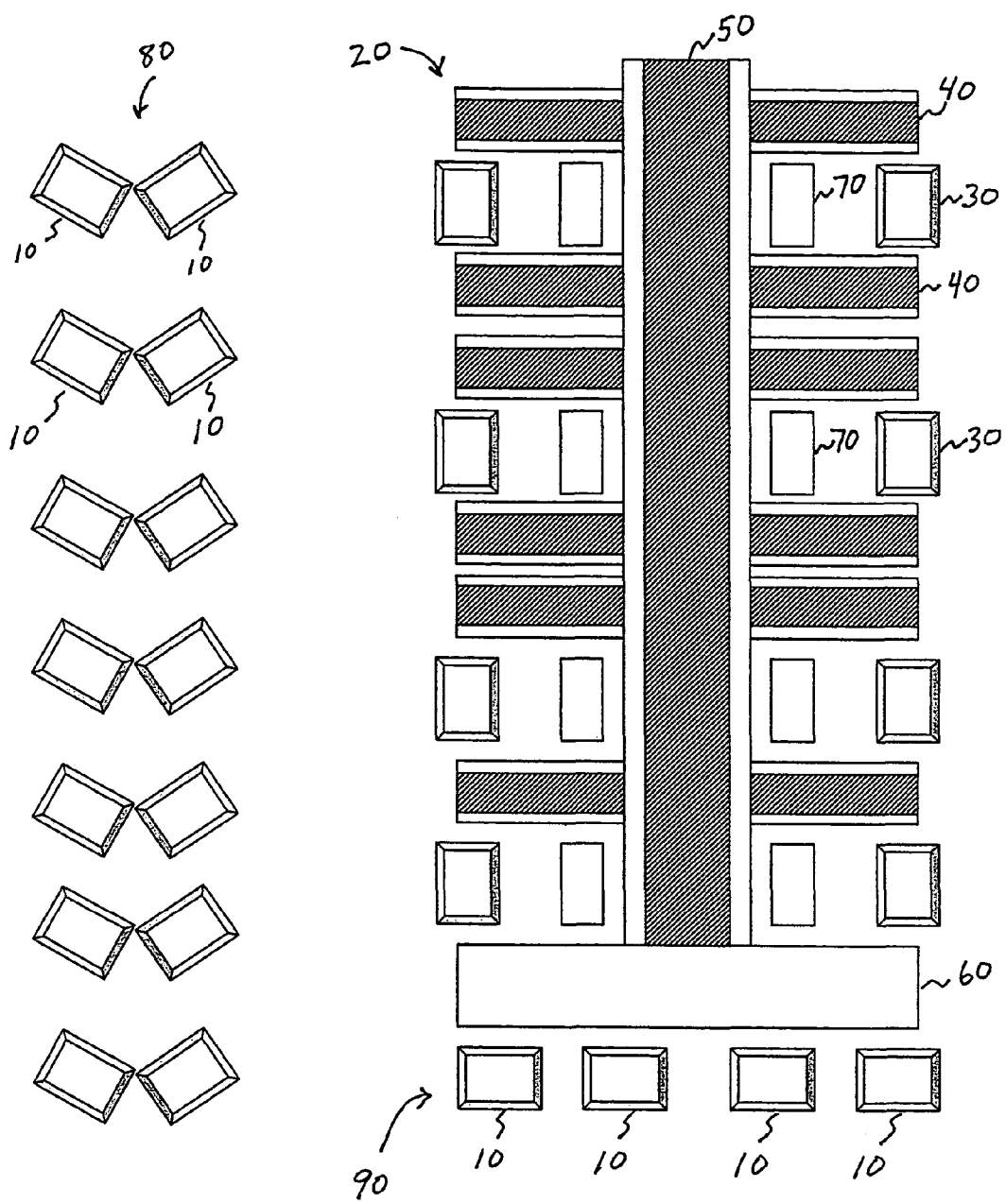
FIG. 2 is a plan view of an alternate embodiment of a boarding pass and baggage check station system.

FIG. 1 illustrates a top plan view of a preferred physical layout. A number of electronic kiosks 10 are provided for passengers to use to check-in and obtain boarding passes. In the form of FIG. 1, the kiosks are arranged in clusters 11 of three kiosks. The clusters of kiosks 10 are arranged in any of a variety of ways, such as in rows 80 of kiosk clusters. Alternatively, they may be arranged in a circle or other fashion. One such alternate embodiment is shown in FIG. 2, in which pairs of kiosks form a cluster and these clustered pairs are arranged in a row 80. Also shown in FIG. 2 is a row of individual kiosks 90 not arranged in a cluster. Regardless of the particular layout, the kiosks 10 preferably are grouped to provide a readily identifiable kiosk check-in area. The actual number of kiosks provided can vary greatly from one airport terminal to the next, depending on the number of passengers expected to use them. In a preferred form, there are about 1.5 to 2 kiosks per baggage check location.

One useful element of the preferred embodiment is a sign or other indicator in the vicinity of the electronic kiosks 10 that signals to passengers that they should go to the kiosk first to obtain a boarding pass before proceeding to the baggage drop area. As best seen in FIG. 4*a*, a "start here" sign or other indicator 13 above each of the kiosk clusters 11 is suitable for this purpose.

In a location preferably adjacent to but somewhat separated from the electronic kiosks, a baggage drop area 20 is provided. As illustrated in FIG. 1, multiple baggage drop areas 20 may be provided in a single airport terminal. One of the advantages of the preferred form of the invention is that passengers obtain boarding passes before approaching the baggage drop area. The boarding passes can be obtained at the electronic kiosks 10 or from other locations. It is useful, however, to have electronic kiosk stations within view of the baggage drop stations but somewhat separated so that passengers without boarding passes will see the nearby kiosks and the "start here" sign or similar signal and understand that they should obtain a boarding pass before approaching the baggage drop station. A "baggage drop" or other sign 92 identifies the baggage drop as a station separate from the kiosks.

The baggage drop area 20, best seen in FIG. 3, includes a central conveyor 50 with several outwardly-extending drop-off points 21. The central conveyor includes an endless belt trained around rollers to carry bags from an origination end to a destination end. Each baggage drop-off point generally includes an attendant station 30, a utility counter 70, and one or two drop-off point conveyors 40. In alternative embodiments, the drop-off point may include additional or fewer features, but is generally characterized as a location at which baggage can be dropped for tagging and conveyance to the aircraft.

The drop-off point conveyors 40 are configured to carry bags toward the central conveyor 50 which, in turn, carries baggage away from the drop points for subsequent loading onto aircraft. As shown, the central conveyor 50 feeds into a housing 94 at the terminal end of the conveyor. Within the housing, the central conveyor 50 continues on toward distribution areas for delivery to appropriate aircraft. In this instance, the central conveyor 50 is shown entering the housing 94 where it ramps downward and below the floor level. In alternate forms it may extend through a wall or take on other appropriate configurations to ensure that the baggage is securely conveyed toward the aircraft.

The number of drop-off point conveyors 40 may vary, depending on the number of passengers and amount of baggage expected. The drop-off point conveyors 40 are shown extending perpendicularly outward from the central conveyor, which provides a suitable work area for an airline agent in the vicinity between drop-off point conveyors. Alternatively, the drop-off point conveyors may extend at other angles. The drop-off point conveyors are exposed and accessible by passengers so that the passengers may deposit their own baggage on the conveyors.

Figure 5:
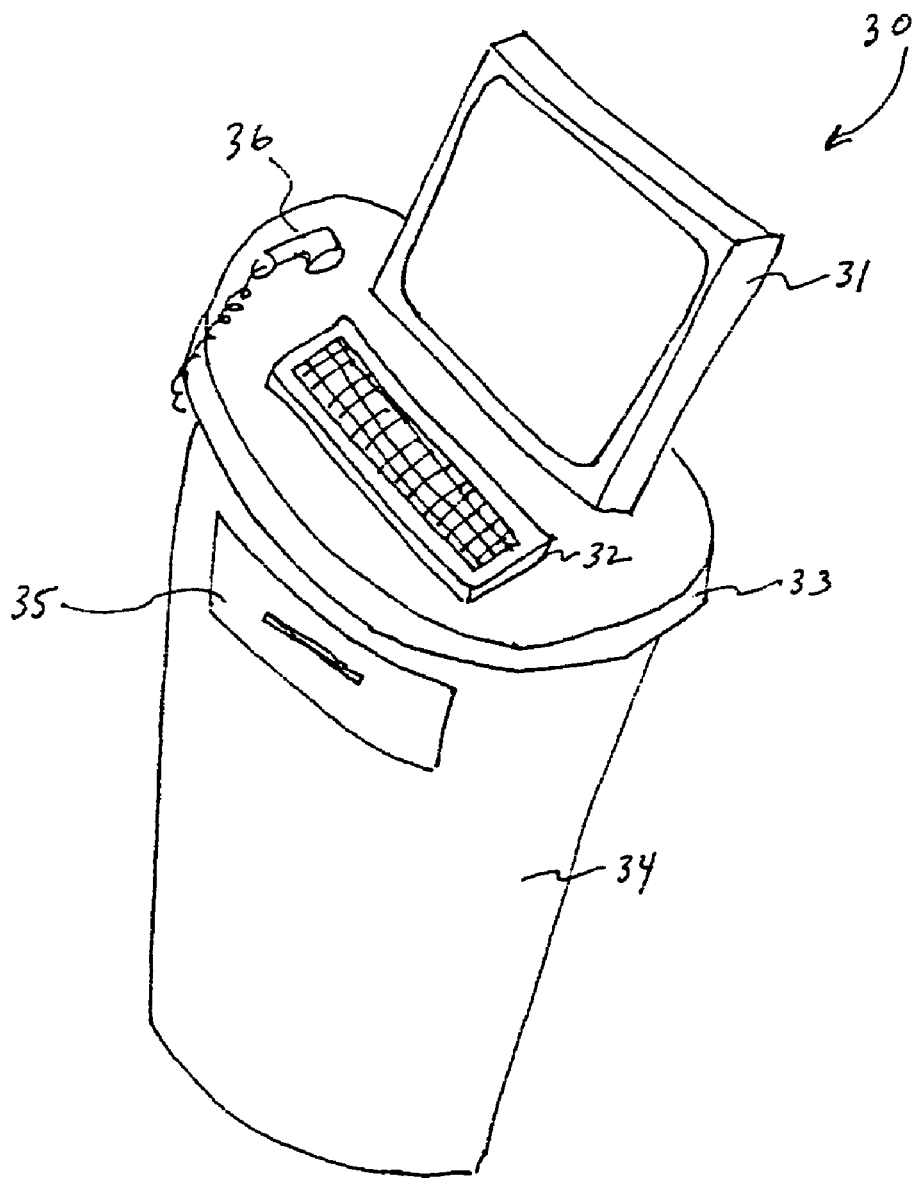
FIG. 5 is a perspective view of a preferred baggage check station.

The attendant station 30 and utility counter 70 further define a preferred baggage drop-off point 21, and are preferably situated between a pair of drop-off point conveyors 40. As best seen in FIG. 5, the attendant station 30 includes a computer, scanner, and other components used by the agent to properly check bags. The utility counter 70 includes a countertop work surface and a number of drawers to store luggage tags and other materials that may be necessary in checking bags. The utility counter 70 may be omitted, consistent with this invention. In alternate embodiments, the attendant station may be constructed with a number of drawers or other storage containers making the utility counter unnecessary.

A barrier 60 is provided adjacent an origination end of the central conveyor 50, with the origination end being defined as the end away from which the bags will travel. Likewise, the destination end of the central conveyor 50 is defined as the end toward which the bags will travel. The principal purpose of the barrier is to prevent passengers from placing bags on the conveyor without properly checking them. The barrier preferably is formed from glass or clear plastic, at least at its upper portion, so that the baggage agents may see what is happening at the row of kiosks 90. In alternate embodiments, the barrier 60 and row of kiosks 90 may be dispensed with, and instead replaced by additional baggage points at the origination end of the central conveyor 50.

Figure 4B:
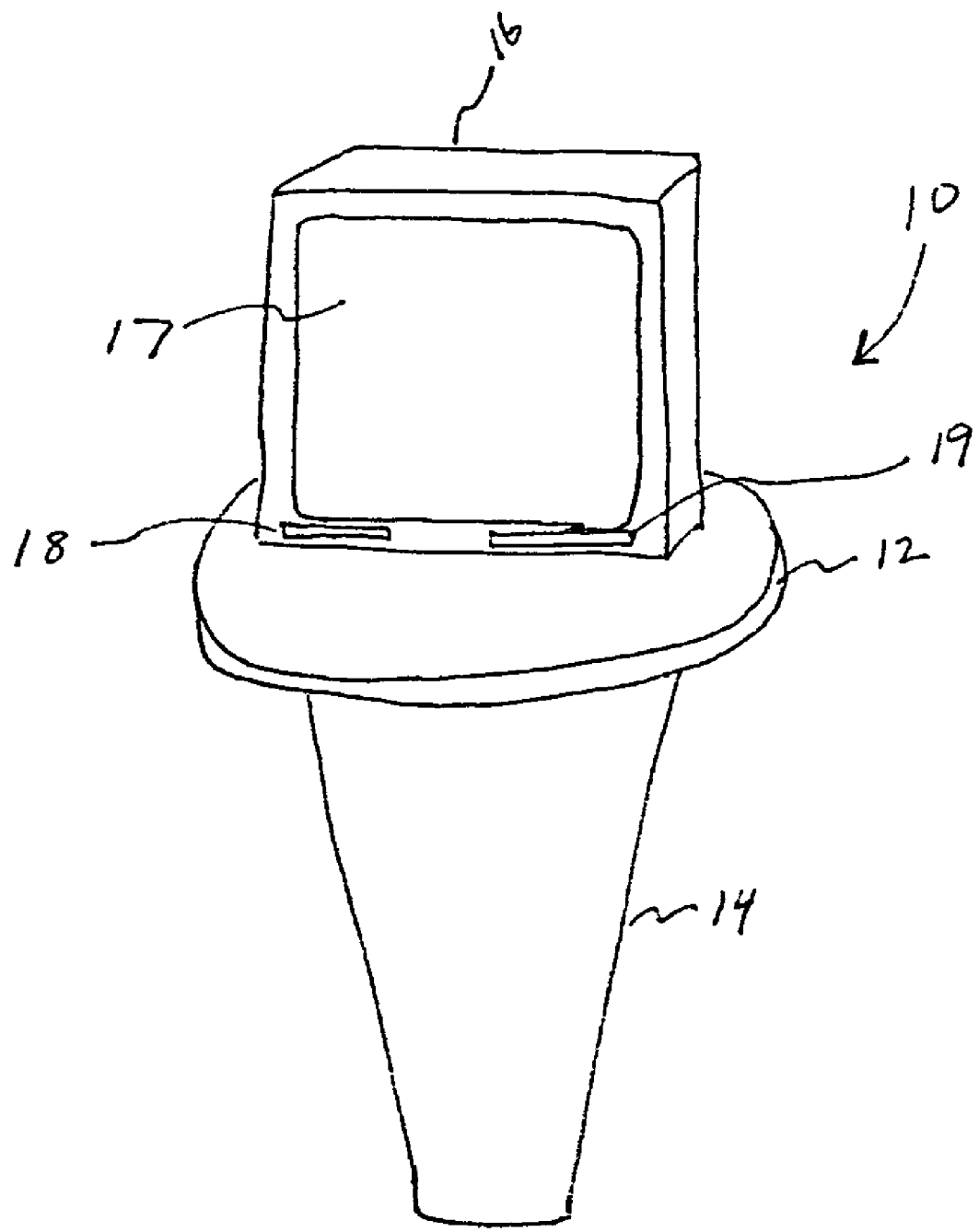
FIG. 4b is a perspective view of an alternate boarding pass kiosk.

FIGS. 4*a* and 4*b* illustrate preferred electronic kiosks 10 to be used by passengers to obtain boarding passes. The kiosk includes a base 14 and countertop 12, with the base preferably formed in an aesthetically pleasing shape. Certainly many other arrangements for the base are possible. The base and countertop 12 support a computer 16 having a touch-screen display 17, magnetic card reader 18, and boarding pass slot 19. As discussed in greater detail below, passengers use the kiosk to obtain boarding passes by initially entering an identification number (such as a flight reservation or electronic ticket number) using the touch screen or by inserting a credit card, frequent flier card, or other card having a magnetic stripe with identifying information into the magnetic card reader slot 18. After following a number of steps, a boarding pass is printed with an internal printer (not shown) and is issued through the boarding pass slot 19.

The preferred attendant station 30 is shown in FIG. 3, with a somewhat alternate construction depicted in FIG. 5. The attendant station 30 includes a base 34 having a drawer 35 and a countertop 33. As with the kiosk 10, any number of sizes and shapes may be used for the base. Likewise, the drawer 35 may be excluded or, conversely, the base may include additional drawers or cupboards for storage of luggage tags, pens, tape, and other items to facilitate checking in baggage. The countertop 33 can optionally include separated surfaces 33*a*, 33*b* (see FIG. 3) to provide separated workspaces for passengers in line for one or the other of the two opposing conveyors 40 served by a single attendant station.

The attendant station also includes a computer having a monitor 31 and keyboard 32. The hardware for the computer may be contained in a single housing with the monitor 31, or may be provided in a separate housing that is stored within the base. The computer may also include a pointer (not shown) such as a mouse, track ball, or stylus. In addition, the monitor may optionally be a touch-screen monitor, as with the electronic kiosks.

A scanner 36 is also provided for use at the attendant station, and is in communication with the computer. A suitable scanner is model 4700LR-131 produced by the Welch Allyn company of Elmont, N.Y. Accordingly, the bar-coded information contained on passenger boarding passes is read by the scanner and passed to the computer for analysis. The computer contains appropriate software to decipher the bar code to obtain information such as the passenger's name, destination, frequent flier number, number of bags to check, traveling companions, and any other pertinent stored information. It may optionally indicate "selectee status," that is, whether the passenger is a person of interest on an FBI or other list, or has been randomly or otherwise selected for additional screening. As discussed further below, the baggage station computer is in communication with a central server to verify the information read from the boarding pass.

Figure 6A:
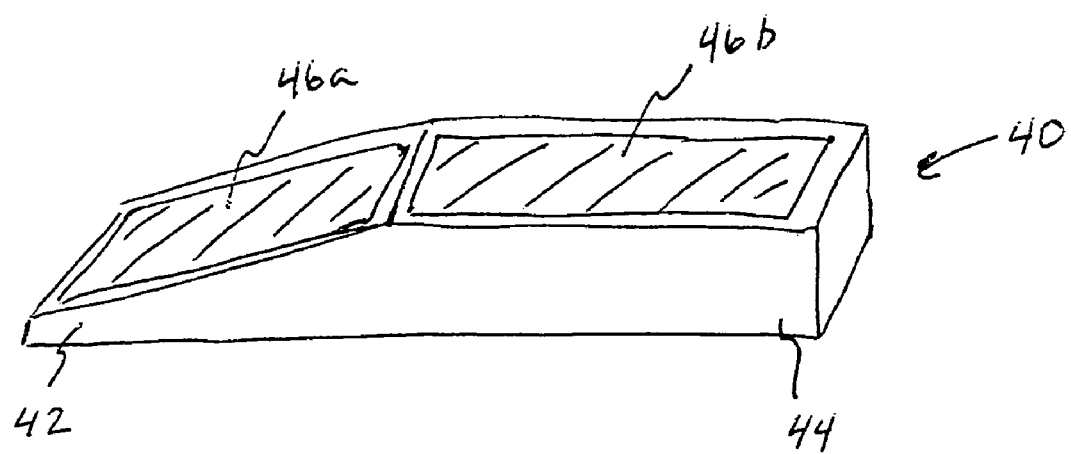
FIG. 6a is a perspective view of a preferred baggage check conveyor.

A preferred form of drop-off point conveyor is shown in FIG. 6a. The drop-off point conveyor includes a first end 44 adjacent the central conveyor 50 and a second end distant from the central conveyor. An endless belt travels in a loop such that bags placed on the belt will travel from the second end toward the first end and the central conveyor. In a preferred embodiment, the drop-off point conveyor includes two sections, an initial conveyor 46a and a staging conveyor 46b. The two sections allow bags to be deposited onto the initial conveyor 46a by the attendant, then to move to the staging conveyor 46b where they will remain until there is a suitable opening on the central conveyor. Once there is a suitable empty location on the central conveyor passing next to the staging conveyor 46b, the system can automatically or under manual control move the bags from the staging conveyor 46b to the central conveyor 50.

In order to facilitate the placement of bags onto the conveyor 40, the second end is relatively close to the floor so that bags need not be lifted very high in order to place them on the belt. In the preferred form, this is accomplished by configuring the second end such that it is lower than the first end. In this embodiment, the conveyor 40 begins to slope downward from a position approximately in the center of the conveyor toward the second end 42. The downward angle may begin at any location other than the center. In alternate embodiments, the entire drop-off point conveyor 40 may be configured to be low to the floor. In yet another embodiment, the drop-off point conveyor angles downward from the first end 44 across the entire length toward the second end 42.

By producing the second end of the conveyor close to the floor, very little lifting is required for the bags. Accordingly, if agents place bags on the conveyor repeatedly throughout the day, they are less prone to injury than with a higher conveyor. Moreover, the location and configuration of the drop-off point conveyors provides many advantages over the ticket counter configuration, regardless of the height of the drop-off point conveyors. The conveyors extend outward and are unobstructed so that they are readily accessible to passengers. By using the drop-off point layout, agents can now avoid lifting heavy bags from the scale and carrying them across the floor to a conveyor behind the ticket counter. In addition, because passengers can now walk directly up to the conveyor, passengers can deposit their own bags on the conveyor so that agents need only offer occasional assistance with lifting bags, rather than lifting every bag that is checked, as with current systems.

Figure 6B:
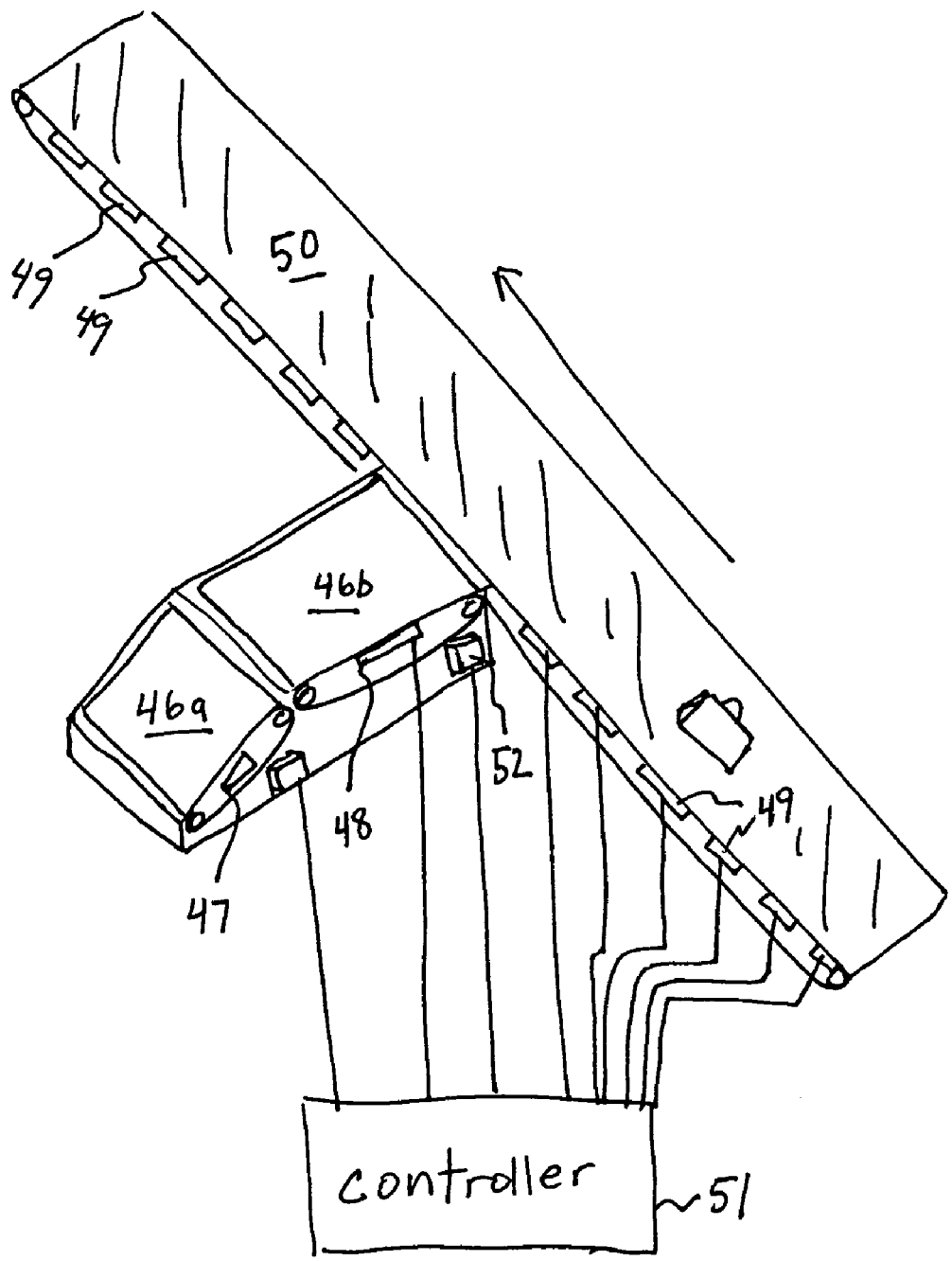
FIG. 6b is an illustration of a preferred baggage check conveyor and central conveyor, depicting internal scales and sensors.

The drop-off point conveyor 40 also includes a built-in scale, as illustrated in FIG. 6b. Within the initial conveyor 46a is a scale 47 configured to detect the weight of bags or other items deposited onto the initial conveyor. Any of a variety of scale configurations are suitable for this purpose, such as spring scales, strain gauges, or other scale types. The scale 47 is in direct or indirect communication with the attendant station in order to present the weight of bags on the initial conveyor 46a on the display 31. Alternatively, or in addition, a display attached to the conveyor provides a visual readout of the weight of the items on the conveyor belt. The operation of the system of conveyors is discussed further below.

Figure 7:
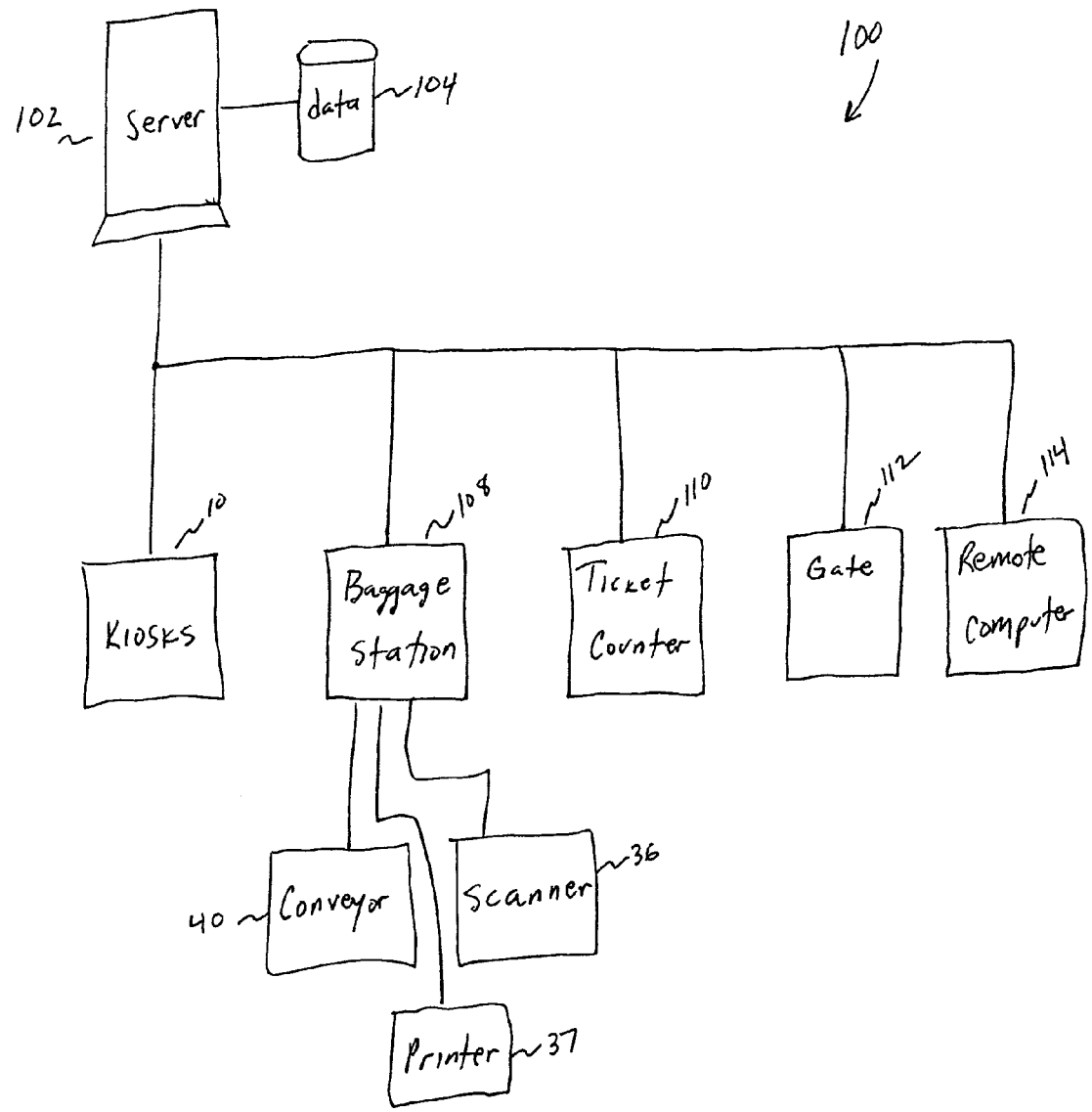
FIG. 7 is a block diagram of a preferred check-in system.

FIG. 7 provides a block diagram of the interaction of many of the electronic components of the preferred embodiment. The system overall is generally referred to by reference numeral 100. A server 102 having a database 104 is provided in communication with the other components, including the electronic kiosks 10, baggage station computer 108, ticket counter 110, gate computer 112, and remote computer 114. Although only one device is shown for each of the above examples, any number of kiosks, baggage stations, etc., may be included. Likewise, the server 102 may comprise only one or a plurality of separate computer processors configured to control passenger ticketing, check-in, and related flight information.

The database 104 contains flight information such as flight schedules, passenger reservations, confirmation codes, electronic ticket numbers, frequent flier numbers, and indicators related to whether passengers have checked-in and have bags to check. The database is preferably located within a memory on the server computer 102, but may also be located in a remote memory in communication with the server. The "memory" may be any computer-accessible database such as, for example, a magnetic hard drive, optical CD-ROM, magnetic tapes, RAM chips, or EEPROMs.

Figure 9:
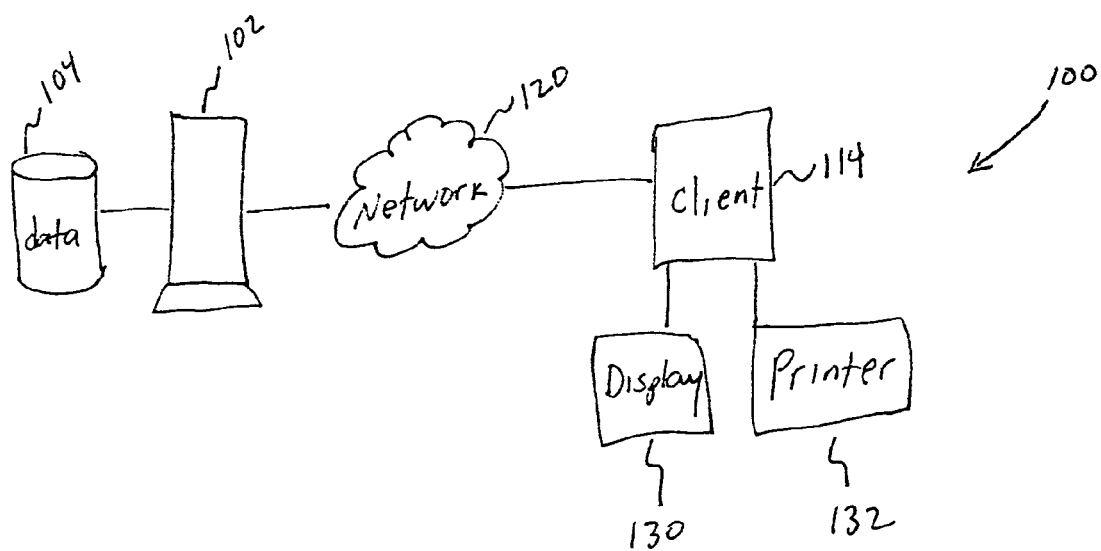
FIG. 9 is a block diagram of a preferred remote check-in system.

Passengers obtain boarding passes, as discussed further below, by accessing a kiosk 10, ticket counter computer 110, gate computer 112, or remote computer 114. In each case, the passenger or airline agent accesses the server 102 and database 104 to check-in to the flight and obtain a boarding pass. The kiosks 10, ticket counter computers 110, and gate computers 112 are preferably in communication with the server over a secure internal network. The remote computers 114, on the other hand, access the server over a public network such as the Internet, as shown in FIG. 9. Although representatively illustrated as accessing the common server 102, the remote computers may preferably access a different Web server (not shown) for enhanced security. The additional Web server provides a layer of security preventing unauthorized access to the server 102. The Web server is configured to access the database 104 to allow remote check-in.

Similarly, the baggage station computers 108 are in configured to be in communication with the server 102 to access information related to passenger reservations, boarding passes, and other flight information. In addition, the scanner 36 and printer 37 are connected to the baggage station computer 108. The conveyor 40 may be controlled via touch-panel instructions on the display, or via a separate control panel adjacent the conveyor (not shown).

Figure 8:
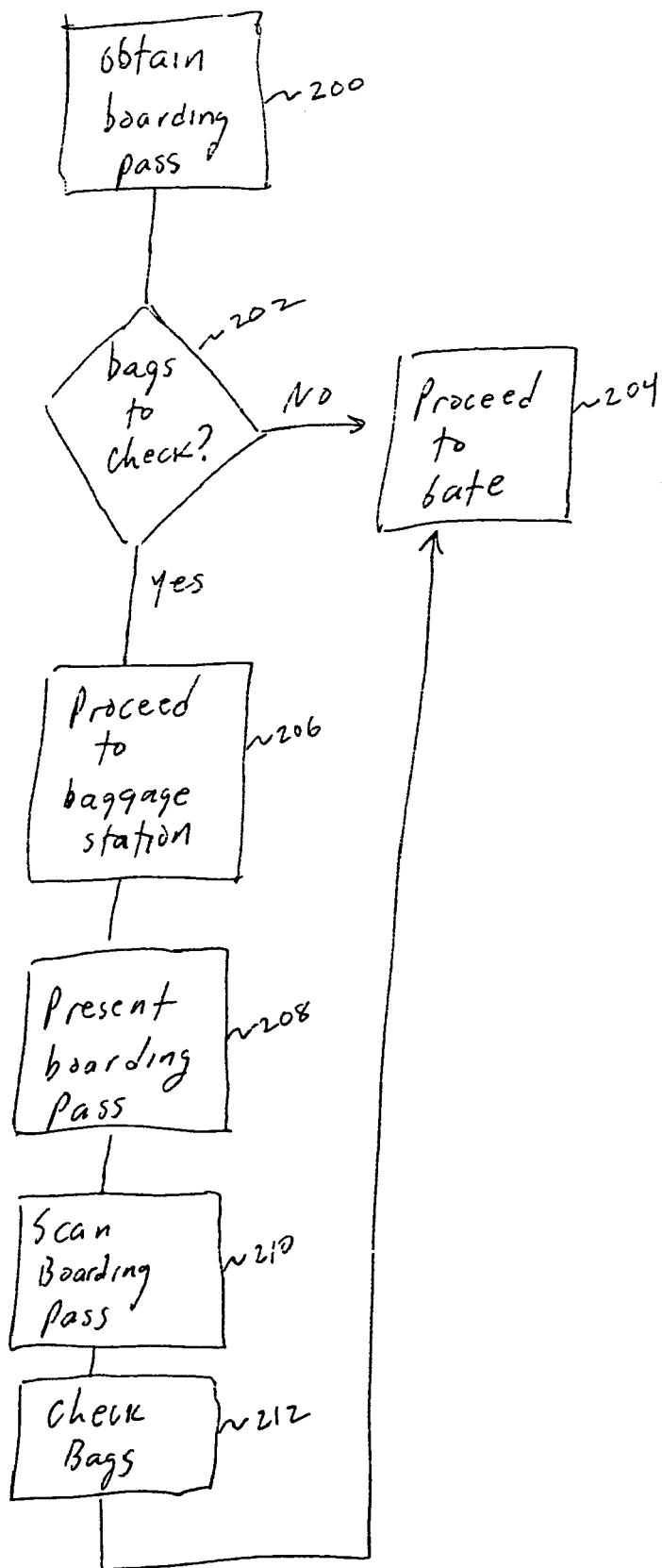
FIG. 8 is a flow diagram of a preferred check-in and baggage check method.

As best seen in FIG. 8, the check-in process involves two steps, including first obtaining a boarding pass and then checking bags. Note that while the preferred process involves two discrete steps at two separate locations, passengers may still obtain a boarding pass and check-in baggage in a single step at the baggage drop point. Accordingly, the baggage drop computers 108 are configured to produce boarding passes in the same manner as the electronic kiosks 10. While this alternative embodiment may not achieve some of the advantages in time savings as the preferred embodiment, it still offers other advantages, such as an improved layout for lifting bags onto the conveyor.

Using the preferred method, all passengers, whether they possess paper or electronic tickets, now start their check-in process at a location other than the baggage drop location.

Preferably, the check-in begins either on the kiosk or on the Web. With reference to FIG. 8, the preferred method begins at a first block 200, at which a passenger obtains a boarding pass. This first step may be accomplished in several ways, including Web check-in, electronic kiosk check-in, or ticket counter check-in.

Web check-in. Those who use the Web check-in process first obtain their boarding passes by accessing an internet site and printing the boarding pass as described, for example, in U.S. patent application Ser. No. 09/666,225, which is incorporated by reference.

An exemplary configuration for Web check-in is shown in FIG. 9. A client computer 114 is a remote computer that is coupled to the server 102 over the Internet 120. The "remote" association in this sense does not necessarily imply a great distance, but rather acknowledges that it will typically be a different computer than the server 102. In general, the client will be a home or office personal computer capable of accessing the server over the Internet. Nonetheless, the client may alternatively be any electronic device capable of accessing the server over the network 120 including, for example, a television set-top box, "palm-top" device, cell phone, pager, or other device. Because portable computers, modems, phone lines, and cell phones are widely available, the remote computer, or client 114, may be located anywhere that Internet access is available.

The client computer 114 includes a display 130 that is coupled to the client and displays the graphical Internet pages or other information downloaded from the server 102. The display is a computer monitor of the type typically connected to a home or office computer. Alternatively, the display may include a television, LCD panel, or any other device capable of conveying electronic information received from the server.

The remote computer system also includes a printer 132 coupled to the client 114. The printer is a laser printer, ink jet printer, dot matrix, or similar printer such as that typically found in a home or office environment. The printer may alternatively include any associated printing device, such as a digital photocopier, capable of printing a boarding pass or other documents. While no special paper sizes or formatting is required, the printer is preferably able to print information on standard 8½ by 11 inch paper. Likewise, although the printer is associated with the client, it need not be located adjacent the client. Rather, it may be distant from the client as with a shared or networked printer.

Figure 10:
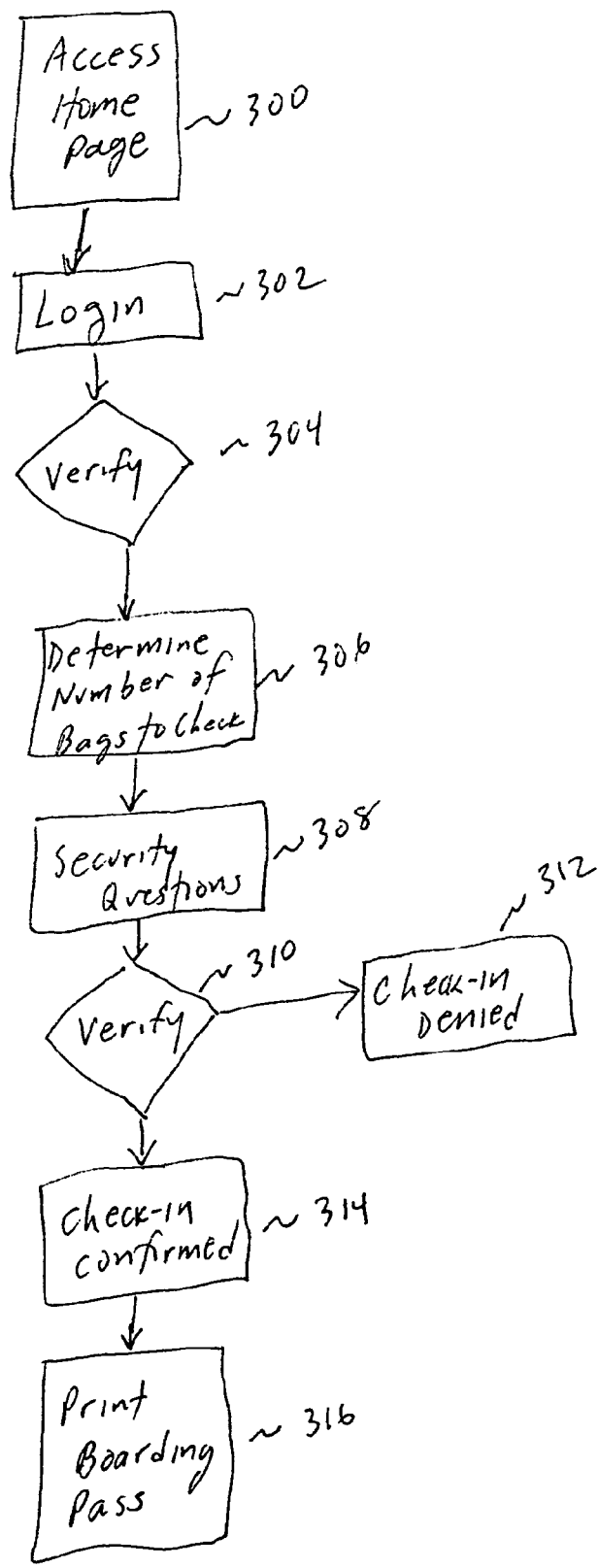
FIG. 10 is a flow diagram of a preferred remote check-in method.

A flight passenger uses the system such as that depicted in FIG. 9 to check-in and obtain a boarding pass. Referring to the flow chart of FIG. 10, a passenger accesses the main or "home" page on the server 102 at a first block 300 by entering an appropriate URL into an Internet browser or other commercially available software allowing Internet communication. At block 300, a HyperText Markup Language ("HTML") Web page is sent to the client 114 so that it may be viewed under the browser software. While HTML is the preferred format for transmitting information from the server to the client, it is certainly not the only format possible. Rather, the client and server may communicate using any of a variety of other languages and data formats.

After accessing the home page at block 300, the passenger is presented with a variety of alternatives contained on the home page, including for example, the remote check-in, ability to check flight schedules and departure times, make reservations, inquire about frequent flier incentives, and view other informational or promotional subjects. The passenger may select any of these options using conventional means such as by clicking on an associated "hypertext" link or by entering a number, letter, or other symbol representative of the chosen option. While this arrangement contemplates the consolidation of the remote check-in with other Internet-based services, it need not be integrated. Rather, the remote check-in system can be contained on separate Web pages within the same or separate servers. Likewise, if the passenger knows the URL associated with the remote check-in or other options, he may retrieve that page directly, bypassing the home page.

After accessing the home page and selecting the remote check-in option, at block 302 the passenger logs into the system. At this point, the passenger is asked one or more questions or asked for information to initiate the remote check-in. For example, the passenger may be asked for a reservation number, frequent flier number, electronic ticket number, password, or other information to confirm the identity of the passenger. Responses to these and other inquiries are stored in the database 104. The passenger may also be asked to verify a particular flight for which the passenger is attempting to check-in. The process then proceeds to block 304, where the login information is verified by accessing the database 104. If the information provided by the passenger is inconstant with that stored in the database, the process returns to block 302 to attempt login. If the login information is confirmed, the process proceeds to block 306 to complete the check-in.

At block 306, the passenger is asked whether there are bags that must be checked and, if so, how many. If the passenger is checking bags the system will allow the remote check-in and will also instruct the passenger to check-in any baggage at a baggage drop-point, a self-service baggage check station, or ticket counter.

The system next proceeds to block 308 at which the passenger is presented with an itinerary and are asked security questions. The security questions are required by the FAA and presently include, "Has anyone unknown to you asked you to carry an item on the flight?" and "Have any items you are traveling with been out of your immediate control since you packed?" At block 308, the passenger responds to the security questions and submits answers to the server 102, which evaluates the responses at block 310. If either of the security questions is answered incorrectly (a "Yes" answer is incorrect), the remote check-in is denied and the server sends a message to the client indicating that the passenger must check-in at the airport. In an alternate embodiment, the server can return to block 308 so that the passenger can reevaluate the security questions and amend the responses. The present invention need not ask the particular security questions quoted above, nor any security questions at all. Rather, the security may be eliminated or modified, consistent with the present invention.

If the security questions are correctly answered, the system proceeds to block 314 at which the remote check-in is confirmed. The server 10 sends the client 30 a confirmation page containing the flight itinerary, including the date, flight number, departure location and time, destination and time, seat number, and departure gate. Up to four flight segments are preferably indicated on the confirmation page, although any number of segments may be shown, consistent with this invention. The confirmation page also includes the confirmation code, frequent flier number, and directions to the gate. Preferably, the gate directions include a map showing the airport, airline concourse, departure gate, and other useful landmarks such as an airline service center, ticket counter, frequent flier lounge, restrooms, and restaurants. The passenger is instructed to print the confirmation page on any associated printer, which is accomplished at block 316, and present the printed page with a photo identification card at the appropriate gate prior to departure.

The printed confirmation page includes a two-dimensional bar code or other machine or optically-readable symbol. The bar code corresponds to the passenger's name and confirmation code. The bar code can alternatively contain any other encoded information such as a name, seat number, flight number, number of bags to check, selectee status, and other information, but preferably is at least sufficient to relate a particular passenger with a particular flight. In this regard, the bar code need have nothing more than a single record number that is associated with a record stored in the database and which contains the passenger's flight number, seat, number of bags to check, and other information.

One additional advantage of the preferred boarding pass format is that the encoded information includes an indication regarding additional charges or fees. In some instances, additional charges may be applicable for a particular passenger, for example for special services for pets, unaccompanied minors, or large baggage such as a bicycle or surf board. Preferably, these aspects are recorded at the time the reservation is made, and stored as part of the passenger's record by including applicable codes or flags with the reservation record. When checking in, any applicable services triggering additional charges or fees are also encoded in the bar code or other region of the boarding pass. Because additional fees are applicable, in a preferred form an exchange document is issued rather than a boarding pass. The exchange document would contain some or all of the same information as the boarding pass, but would not indicate that the passenger is approved for boarding. When the boarding pass or exchange document is scanned at the baggage drop point, the associated display will quickly provide a summary of the additional charges or fees that must be collected, thereby speeding the process.

The above description assumes that the passenger accesses the remote check-in system after obtaining a flight reservation and corresponding confirmation code. Alternatively, these two processes (obtaining a flight reservation and checking-in) may be consolidated into a single process. That is, after securing a flight reservation, the passenger may proceed immediately to the remote check-in process, assuming that the flight is scheduled for that day.

Kiosk check-in. Those who arrive at the airport without boarding passes will first proceed to a kiosk 10. In the preferred physical layout as shown in FIG. 1, passengers access any one of the kiosks provided in the kiosk clusters. Thus, each passenger proceeds to a kiosk, enters a confirmation number, reservation number, electronic ticketing number, credit card, or other form of identification in order to obtain a boarding pass. In doing so, much of the information that would be gathered at the time bags are checked can be provided by the passenger in a self-service fashion. Such information includes, for example, the number of bags to check, the final destination, seat preferences, frequent flier mile accounts, and other matters.

In general, the process for electronic kiosk check-in is similar to that for the Web check-in, except that it takes place at a kiosk rather than a home or work computer. Accordingly, the preferred kiosk check-in will involve logging in, verification, security questions, ascertaining the number of bags to check, obtaining frequent flier numbers, and printing a boarding pass. Responses to the above inquiries, such as the number of bags to check and other matters, are stored in the database 104.

The boarding pass or exchange document, whether obtained at the kiosk or over the Internet, is bar coded and contains (coded or uncoded) the customer's name, routing, class of service, security status, mileage plan status, special service codes, fees to be collected and number of bags to check. While bar-coding (using one- or two-dimensional encoding) is preferred, any other means of storing information may be used, including ordinary printing, storage on a magnetic strip or other electromagnetic media, or other encoded printing forms. The first step at block 200 is completed once the boarding pass is printed. In an alternate form, the document printed during Web check-in or at the kiosks need not be a boarding pass, but can be a document sufficient to allow the passenger to pass through security and to proceed to the baggage drop. In such a form, the document would still contain some or all of the information described above.

Checking baggage. After the passenger has obtained a boarding pass, the process proceeds to block 202 to determine whether the passenger has bags to check. If not, the passenger proceeds to the gate, block 204, to board the aircraft. If there are bags to check, the passenger proceeds to a baggage drop-off point, block 206, to check in baggage.

In order to check bags, the passenger takes any bags to check and the bar coded boarding passes to any baggage drop check-in area, presenting the boarding pass and a photo identification card to the agent at block 208. The agent then scans the customer's boarding pass, including the bar coded information. The baggage check computer 108 is configured to automatically decipher the encoded information on the boarding pass and cause key customer information to appear on the agent's monitor 31, such as the passenger's destination and number of bags to check. This information may be obtained either because it is directly encoded on the boarding pass or by using information encoded on the boarding pass to access appropriate records stored on the database 104 associated with the server 102.

In an alternate embodiment, the workstation computer at the baggage drop point contains programming instructions that allow it to associate the information encoded in the bar code with a particular passenger and may optionally cause the display 31 to display a photograph of the passenger checking baggage. Prior to traveling, passengers provide a photograph or have their photographs taken by the airline. The photographs are then stored in the server database 104 and accessed by the workstation computer after scanning the boarding pass. The display 31 displays the appropriate stored passenger photo upon scanning the boarding pass bar code by associating a passenger name (or frequent flier number) with a stored photo. According to this embodiment, the passenger need not produce a photo identification card to board the flight. Rather, the gate agent can simply compare the displayed photograph with the passenger to confirm that the passenger indicated on the boarding pass is the same individual that is boarding the flight.

By automatically presenting the baggage check agent with pertinent information such as the customer's name, flight number, destination, and number of bags to check, the check-in process is greatly shortened, saving agent time and making them more productive.

After the passenger information has been scanned and presented on the monitor, the agent obtains the appropriate destination tags and applies them to the baggage. The passengers place the bags on the drop-point conveyor 40, either before or after tagging. While the agent can lift the bags onto the conveyor, the bag placement is preferably performed by the passengers.

Because the conveyor includes a built-in scale, the bags are weighed automatically. The scale is connected to the baggage drop-point computer which automatically recognizes when bags have been placed on the conveyor and causes the monitor 31 to indicate the total weight of bags currently on the conveyor. If an additional fee is required because of excess baggage weight, software stored on the drop-point computer automatically determines the amount of the fee and indicates it on the monitor.

Additional collection fees for items such as excess baggage or special services are identified in advance because the passenger has already requested them when obtaining the boarding pass, and these items are included in the bar coded information. When such additional fees are appropriate, they are calculated by the drop-point computer based on the encoded information and flagged to the customer service agent on the workstation monitor 31.

The agent collects the fees using a touch screen enabled workstation computer and front-end application. Software stored on and operated by the computer determines the amount of any additional fees and presents them on the monitor. The agent then indicates whether payment has been made and the manner of payment by touching appropriate "buttons" on the touch screen to indicate, for example, cash or credit card payment. Cash payment is preferably made and retained by using the drawer 35 provided in the workstation 30 as a cash drawer. Likewise, a credit card reader (not shown) is maintained either on the countertop 33, attached to the monitor, or within the drawer 35 for processing credit card payments.

Once bags are properly tagged, weighed, and deposited on the conveyor 40, they are checked-in for the flight, completing block 212. In the preferred embodiment as described above, the conveyor includes two sections, an initial deposit belt 46*a* and a staging belt 46*b*. Bags are weighed on the initial belt 46*a*, then advanced to the staging belt 46*b* by depressing a manual advance button on the control panel or touch screen display, depending on the particular embodiment implemented. At that point the passenger may proceed to the gate to board the flight, block 204.

In a system employing several conveyors 40 adjacent a central conveyor 50, it is useful for the staging conveyors 46*b* to coordinate the depositing of bags onto the central conveyor. With reference to FIG. 6*b*, the system is controlled by a controller 51 having a computer processor and memory with stored programming instructions to ensure that bags are deposited onto the central conveyor in an organized fashion, preventing bags from staging conveyors 46*b* from being pushed into other bags already on the central conveyor. The controller can optionally include a dedicated computer processor or can comprise a software application on a more general purpose or multi-purpose machine. In this fashion, the system monitors which staging conveyors contain bags by using either a sensor (such as a weight monitor) or by monitoring which initial conveyors 46*a* have recently been operated, thus depositing bags onto adjacent staging conveyors 46*b*.

A plurality of weight sensors 49 under the central conveyor provides input to the controller 51 regarding the locations along the central conveyor 50 that contain bags. As a bag moves along the central conveyor 50, the weight sensors sequentially detect the presence of the bag. Alternatively, or in addition, the controller 51 tracks which staging conveyors have been recently operated in order to determine empty and occupied sections of the central conveyor based on the speed of the belt. Thus, the staging conveyors 46*b* each include a motor 52 that causes the belt to operate and bags to move toward the central conveyor 50. Upon operation of the motor the controller 51 receives a signal indicating that the staging conveyor has been operated and therefore assumes that one or more bags has been deposited onto the central conveyor 50. By evaluating information related to the location of bags on the central conveyor and the presence of bags on the various staging conveyors that are waiting to be deposited onto the central conveyor, the staging conveyors 46*b* are operated under control of the controller 51 to deposit bags onto the central conveyor without colliding with other bags already on the conveyor. The staging conveyors may also be operated by the controls at each station, allowing any attendant to deposit bags onto the central conveyor and to override the operation of the controller 51.

Alternate forms of sensors may be used in place of the weight sensors 49 described above. For example, a light transmitter and light receiver can be placed on opposing sides of the central conveyor such that a beam of light extends across the conveyor perpendicular to the path of travel in order to detect when an object crosses the path of the light. When light is not received at the receiver, which is in signal communication with the controller, the controller interprets the condition as the presence of a bag or similar object on the conveyor in the location of the sensor. By placing pairs of light sensors along the length of the central conveyor (similar to the distribution of the weight sensors), the controller can determine the presence or absence of bags at any location along the central conveyor.

This improved check-in structure and process provides a number of advantages. The boarding pass now contains additional pre-processed information about each customer that ultimately speeds up the check-in process once the customer reaches the bag drop podium. By placing customer check-in data on the bar code (or making it accessible through the database via the barcode) the check-in time is reduced as much as fifty percent because the agent already knows how many customers are checking in at this time, how many bags the customer is checking, and whether or not additional service fees need to be collected.

While the preferred embodiment of the invention has been illustrated and described, as noted above, many changes can be made without departing from the spirit and scope of the invention. Accordingly, the scope of the invention is not limited by the disclosure of the preferred embodiment.

The embodiments of the invention in which an exclusive property or privilege is claimed are defined as follows:

1. A method for checking a passenger and baggage into an airline flight, comprising:
   providing an electronic station configured to enable the passenger to obtain a boarding pass at a first location inside an airport terminal,
   receiving from the passenger, at the electronic station, information associated with the passenger;
   providing the passenger with the boarding pass, the boarding pass containing at least a portion of the information received from the passenger and an indicator that the passenger has checked in;
   receiving from the passenger the boarding pass at a second location inside the airport terminal, the second location being separated from but in view of the first location, the second location further being adjacent a baggage drop conveyor;
   scanning the boarding pass at the second location; and
   checking the baggage at the second location in accordance with information obtained from the boarding pass, wherein the information comprises a destination and number of bags to be checked.

2. The method of claim 1, wherein the information contained on the boarding pass is printed on the boarding pass in the form of a barcode.

3. The method of claim 2, further comprising scanning the boarding pass at the second location to retrieve the information.

4. The method of claim 2, wherein the second location further comprises a central conveyor and the baggage drop conveyor has a first end and a second end, wherein the first end of the baggage drop conveyor is adjacent the central conveyor.

5. The method of claim 4, further comprising the passenger placing the baggage on the baggage drop conveyor substantially at the second end of the baggage drop conveyor.

6. The method of claim 5, wherein the baggage drop conveyor comprises a scale and the method further comprises the step of weighing the baggage with the scale.

7. The method of claim 6, wherein the first location comprises an electronic kiosk.

8. A system for checking a passenger and baggage into an airline flight, comprising:
a server coupled to a database containing stored passenger and flight information;
a boarding pass station comprising a client computer configured for communication with the server, the client computer having a processor, a display, and an associated printer, the processor executing program instructions to request itinerary information from the passenger, retrieve information from the database, and cause the printer to print a boarding pass; and
a baggage drop station located separate from the boarding pass station, the baggage drop station comprising a central conveyor having an origination end and a destination end and configured to convey baggage in a direction from the origination end toward the destination end; and
a baggage drop computer located at the baggage drop station and configured for communication wit the server, the baggage drop computer having a processor, a display, a scanner, and an associated printer, the processor executing program instructions to receive and interpret images scanned from the boarding pass and to allow baggage to be checked into the flight at the baggage drop station only if the passenger has already checked in.

9. The system of claim 8, wherein the boarding pass includes a barcode containing the number of bags to be checked.

10. The system of claim 9, wherein the baggage drop station further comprises a plurality of baggage drop conveyors each having a first end and a second end, wherein the first ends of the baggage drop conveyors are adjacent the central conveyor and the baggage drop conveyors are configured to convey baggage from the second end toward the first end and the central conveyor.

11. The system of claim 10, wherein at least one of the baggage drop conveyors further comprises a scale for weighing baggage placed on the baggage drop conveyor.

12. The system of claim 11, wherein the second end of the baggage drop conveyor is lower than the first end.

13. The system of claim 11, wherein the client computer is a home or office computer.

14. The system of claim 11, wherein the client computer is located outside the airport.

15. The system of claim 11, wherein the client computer is an electronic kiosk located inside the airport.

16. A system for checking a passenger and baggage into an airline flight, comprising:
a server coupled to a database containing stored passenger and flight information;
a plurality of electronic kiosks, each of the kiosks configured for communication with the server, the kiosks executing program instructions to request information from the passenger, retrieve flight and passenger information from the database, and cause an associated printer to print a boarding pass, wherein the boarding pass contains an indication of the passenger's name and number of bags to be checked; and
a baggage drop station located separate from the boarding pass station and within an airport terminal, the baggage drop station comprising (1) a central conveyor having an origination end and a destination end and configured to convey baggage in a direction from the origination end toward the destination end, and (2) a plurality of baggage drop point conveyors extending outward from the central conveyor, the drop point conveyors having a first end adjacent the central conveyor and a second end distant from the central conveyor, the drop-point conveyors further being configured to convey baggage from the second end toward the first end to be deposited onto the central conveyor; and
one or more signs directing the passenger to begin the check-in process at one or more of the kiosks before proceeding to the baggage drop station.

17. The system of claim 16, further comprising one or more sensors associated with the central conveyor and configured to detect the presence of an item on a portion of the central conveyor.

18. The system of claim 17, wherein the drop point conveyors comprise:
an initial conveyor, the initial conveyor having an endless belt at least part of which defines an upper surface, the upper surface of the belt being configured to travel from a first end of the initial conveyor to a second end of the initial conveyor; and
a staging conveyor, the staging conveyor having an endless belt at least part of which defines an upper surface, wherein the initial conveyor is configured to deliver bags to the staging conveyor and the staging conveyor is configured to deliver bags to the central conveyor, and further wherein at least a portion of the upper surface of the initial conveyor is relatively lower than a the upper surface of the staging conveyor.

19. The system of claim 18, further comprising:
a motor adapted to cause the staging conveyor endless belt to rotate;
a sensor associated with the staging conveyor to detect the presence of an item on the staging conveyor; and
a conveyor controller in signal communication with the motor, the staging conveyor sensor, and the one or more sensors associated with the central conveyor and configured to cause the staging conveyor to deposit bags onto the central conveyor only where there are no detected bags in an interfering position on the central conveyor.

20. A method for checking a passenger into an airline flight, comprising:
providing an electronic station at a first location, the electronic station having a display and an input device, retrieving, at the electronic station, information from the passenger related to the identity of the passenger and at least one additional item of passenger information related to the need for special service;

verifying that the passenger holds a reservation for the airline flight;

providing the passenger with a printed record, the printed record containing passenger identifying information and the at least one additional item of passenger information; receiving, from the passenger, at a second location, the printed record; and processing passenger check-in in accordance with the passenger identifying information and the at least one additional item of passenger information.

21. The method of claim 20, wherein the at least one additional item of passenger information related to the need for a special service comprises an indication of additional charges to be collected, and processing passenger check-in further comprises collecting the additional charges and issuing a boarding pass.

22. The method of claim 20, wherein the at least one additional item of passenger information related to the need for a special service comprises an indication of the presence of an unaccompanied minor, and processing passenger check-in further comprises issuing a boarding pass.

23. The method of claim 20, wherein the at least one additional item of passenger information related to the need for a special service comprises an indication of large luggage to check, and processing passenger check-in further comprises checking the large luggage.

24. The method of claim 20, wherein processing passenger check-in further comprises providing the special service.

* * * * *